Feb. 18, 1958 L. A. MEACHAM 2,824,173

TRANSISTOR SELECTIVE RINGING, DIALING AND PARTY IDENTIFICATION CIRCUIT

Filed Nov. 18, 1954 3 Sheets-Sheet 1

INVENTOR
L. A. MEACHAM
BY James J. Falk
ATTORNEY

Feb. 18, 1958 L. A. MEACHAM 2,824,173

TRANSISTOR SELECTIVE RINGING, DIALING AND PARTY IDENTIFICATION CIRCUIT

Filed Nov. 18, 1954 3 Sheets-Sheet 2

INVENTOR
L. A. MEACHAM
BY James W. Falk
ATTORNEY

INVENTOR
L. A. MEACHAM
BY
ATTORNEY

United States Patent Office 2,824,173

Patented Feb. 18, 1958

2,824,173

TRANSISTOR SELECTIVE RINGING, DIALING, AND PARTY IDENTIFICATION CIRCUIT

Larned A. Meacham, New Providence, N. J., assignor to Bell Telephone Laboratories, Incorporated, New York, N. Y., a corporation of New York Application November 18, 1954, Serial No. 469,802

21 Claims. (Cl. 179—81)

This invention relates to station set circuits for use in telephone systems and more particularly to station set circuits employing transistors and voice frequency signals for carrying out the signaling functions required in multiparty telephone systems.

The signaling requirements of a station set in a modern multiparty telephone system are principally threefold; namely, the set must be able to furnish dialing information to the central office when the subscriber wishes to place a call, the set further must furnish the central office with identification information so that the calling party may properly be assessed for the call, and the set must be selective so as to respond only to the ringing signals assigned to the particular station set.

It is an object of this invention to provide an improved station set having mutually compatible circuits for performing the signaling functions of dialing, party identification, and selective ringing.

It is a further object of this invention to provide such mutually compatible circuits which employ low current amplifiers and simple inductive-capacitive tuning elements.

It is a still further object of this invention to provide station set circuits for performing the signaling functions of dialing, ringing, and identification by means of voice frequency signals.

Still further objects of this invention are to provide station set circuits for use in multiparty telephone systems which involve no use of ground at the station set, which provide full multiparty selection, and which employ common circuit elements for both ringing and party identification.

These and other objects are realized in a specific illustrative embodiment of this invention which comprises a selective ringer having a filter circuit in combination with a transistor amplifier, a party identification circuit utilizing the inductive elements of the filter and a key pulse dialing network, the identification and dialing signals being simple oscillatory transients which may be transmitted simultaneously to the central office.

The selective ringer comprises an antiresonant circuit tuned to the signaling frequency assigned to the station set. The tuned circuit output is applied to an amplifier comprising a transistor having a bias producing diode in its emitter circuit and a transducer in its collector circuit. Due to the action of the diode, which requires a predetermined potential for breakdown, the transistor operates as a class C amplifier and aids the selective filter in suppressing unwanted signals, the amplitude of these signals being insufficient to cause breakdown of the diode. In addition to providing amplitude gating and gain, the transistor circuit, because of its nonlinearity, also produces harmonics of the ringing wave which tend to benefit the quality of the audible signal produced by the transducer.

Oscillatory transients produced by inductance capacitance networks are used as signals for party identification and dialing. The party identification pulse generator comprises a coil having a number of taps thereon and a capacitance which may be selectively connected, during installation of the subset, to any of the taps on the coil. In accordance with one aspect of this invention, the coil advantageously is the one employed in the ringer circuit filter and a tap on the coil is chosen which will produce the frequency assigned the selective ringer, thereby conserving frequency space as well as apparatus. Dialing is accomplished by means of a digit pulse generator which comprises a crosspoint configuration of inductance and capacitance elements capable of producing a frequency distinct digit signal for each operated crosspoint. The party pulse generator and the digit pulse generator are so connected that operation of any of the crosspoints to transmit a digit to the central office also operates the party pulse generator to produce a superimposed party identification signal.

In accordance with one feature of this invention a transistor is used to provide selectivity as well as amplification in a multiparty station set ringer. More specifically, it is a feature of this invention to employ a transistor as an amplitude gate to suppress unwanted signals and thereby provide greater selectivity in a full selective multiparty telephone system.

It is a further feature of this invention to obtain harmonic generation from a transistor in a ringing circuit to improve the quality of the audible ringing signal as well as to permit the transducer to be reduced in physical size.

It is a still further feature of this invention to provide party identification signals for a plurality of telephone subsets on a common or party line by a transient oscillatory wave of a frequency determined by a capacitor, advantageously of the same value of capacitance for each subset, and an inductor, advantageously having a different value of inductance for each subset. In accordance with this feature of the invention, the inductor may be a coil having a plurality of taps thereon, the capacitor of each subset being connected to a different one of the taps.

It is another feature of this invention that the same inductor employed to generate a party identification signal, as mentioned above, be also utilized for selective ringing of the subset. Contacts, operable on removal of the handset from the subset or on replacement of the handset in the subset cradle, switch the inductor between the party identification signaling circuit and the selective ringing circuit. More specifically in accordance with this feature of the invention, the capacitors associated in the party identification and ringing circuits with the common inductor have the same value of capacitance so that the selective ringing circuit responds to the same frequency signal as is generated by the party identification circuit. In this manner, false ringing of another subset on the party line by party identification signals is avoided.

It is a still further feature of this invention to use key pulse signals for both dialing and party identification, each pulse having two frequency components to identify the keyed digit and the calling party, respectively. More specifically in accordance with this feature of the invention, the subset is arranged so that on generation of each digit frequency signal contacts are closed causing the simultaneous generation of a party identification frequency signal.

It is a still further feature of this invention to obtain key pulse signals for dialing from a combination of inductance and capacitance tuning elements having a crosspoint switching arrangement, the keys forming a preferred spacial pattern. More specifically in accordance with this feature of the invention each of a plurality of capacitances may be connected selectively to taps on a single inductor, each tap designating a different value of inductance.

A complete understanding of this invention together with the above-noted and other features thereof may be gained from consideration of the following detailed description and the accompanying drawing in which.

Figure 1:
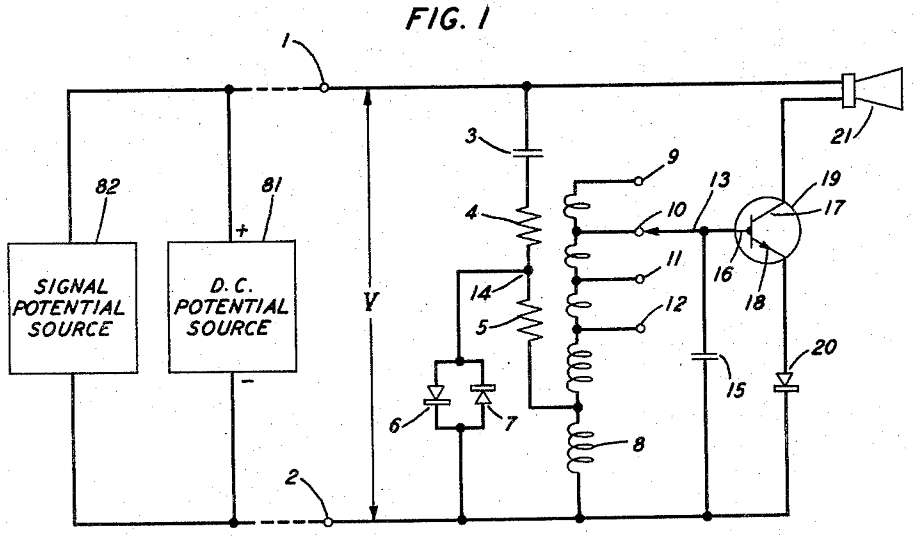
Fig. 1 is a schematic representation of a voice frequency ringing circuit illustrative of one specific embodiment of ringer applicable to the invention.

In order that the invention be disclosed in a clear and concise manner, the disclosure has been simplified to some extent by omitting the talking portions of the embodiment illustrated in the drawing and disclosing only the signaling portions of the circuit at the subscriber's station. It is understood that those skilled in the art may readily add speech transmitting and receiving apparatus to the signaling circuits in the drawing in a manner well known in the art, and that any one of many known types of telephone station sets may be employed for this purpose.

Referring now to the drawing, the specific embodiment of voice frequency ringer illustrated in Fig. 1 comprises a pair of terminals 1 and 2 for connecting the ringer to the subscriber's loop of a multiparty telephone system, a filter network to provide frequency discrimination and thus permit selective ringing, a transistor amplifier having a diode gate connected thereto, and a horn-type transducer.

The filter network is connected across terminals 1 and 2 and comprises a capacitance 3 having one side thereof connected to terimnal 1, a resistance 4 connected to the other side of capacitance 3, and a limiter circuit connected between resistance 4 and terminal 2. The limiter circuit consists of a pair of diodes 6 and 7 connected in parallel, the diodes being poled in opposite directions. A resistance 5 is connected between resistance 4 and an inductance 8. The inductance comprises a coil connected at one end thereof to terminal 2 and has a plurality of taps 9, 10, 11 and 12 thereon. Advantageously, during the installation of the subset one of the taps is permanently connected to a lead 13. For a four-party line each subset on the line would have lead 13 connected to a different tap; accordingly the filter network of each subset would be responsive to a different frequency for operation of the ringer circuit. Lead 13 is connected to one side of a capacitance 15 and to the base electrode 16 of a transistor 19. The emitter electrode 18 of the transistor 19 is connected to one side of a diode 20, which advantageously may be a silicon diode, the other side of which is connected to the other side of the capacitance 15 and to the terminal 2. A transducer 21, which advantageously may be of the horn type, is connected between the collector electrode 17 of the transistor 19 and the terminal 1.

In the operation of the above-described ringer circuit, the signals normally applied to the terminals 1 and 2 are a direct current transistor operating potential, the more positive polarity of which is applied to terminal 1 and the more negative polarity of which is applied to terminal 2, and a signaling potential comprising a single frequency tone in the voice range which is interrupted at a rate of about 10 cycles per second, the potentials being supplied from the sources 81 and 82, respectively, in the central office. The frequency of the signaling potential is different for each station to be selected on the multiparty line. Discrimination is provided by the filter network which is adjusted to be resonant at the assigned frequency of the station set by connection of the capacitor 15 to one of the four coil taps through the lead 13. A voltage limiter comprising the oppositely poled diodes 6 and 7 connected in shunt with the series combination of resistance 5 and the antiresonant circuit serves to limit the voltage at point 14 to a predetermined amplitude in order to cause the input of the filter network to be substantially independent of the length of the line. Thus, signals of more than a predetermined minimum amplitude cause the diodes to conduct and limit the filter input to a standardized voltage. When signals of the tuned frequency are applied to the ringer over the telephone line, a large fraction of the standardized voltage at point 14 appears across the antiresonant circuit and is available to drive the transistor amplifier circuit and operate the transducer 21 to produce an audible ringing signal. For signals away from the resonant frequency, the tuned circuit impedance is small compared to the series resistance 5 so that the antiresonant circuit voltage is insufficient to overcome the transistor bias and the transistor remains inactive. It will be seen that the limiter prevents a large input signal such as might be encountered at a subscriber's station close to the central office from energizing the transistor, even though not of the proper frequency.

Suppression of unwanted signals, and particularly, signals of the frequencies of the adjacent parties, is made very thorough by means of the amplitude gating action of the transistor 19 made possible by the bias producing silicon diode 20 in series therewith. Due to the action of the diode 20, which requires a predetermined potential for breakdown, the transistor circuit behaves as a class C amplifier and aids in the suppression of the off frequency signals as the amplitude of these signals is insufficient to cause the diode to conduct. In addition to providing gain and such amplitude gating, the transistor 19 by virtue of its non-linear characteristics also produces strong harmonics of the ringing signal which act to benefit the quality of the audible signal produced by the transducer 21. Further, the existence of these harmonics permits the transducer to be reduced in physical size, with its region of sensitive response extending to a range substantially above that of the actual ringing frequencies.

Although the transistor 19 has been shown as one of the N–P–N type it will be understood by those skilled in the art that P–N–P and other types of transistors may readily be utilized in the above circuits.

Figure 2:
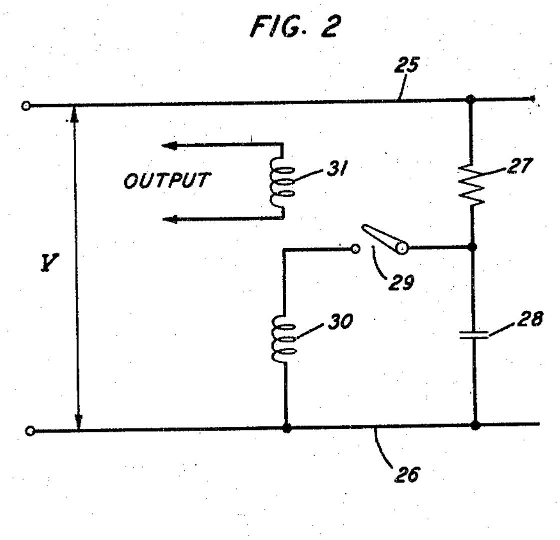
Fig. 2 is a diagrammatic representation of a pulse generator illustrative of an operating principle of specific embodiments of a party pulse generator and a digit pulse generator applicable to the invention.

Fig. 2 illustrates the principles of operation of a party pulse generator and digit pulse generator which may be employed in the station set in accordance with the invention. The signals generated by these devices for dialing and party identification are simple oscillatory transients produced by inductance capacitance circuits. Such circuits basically may comprise a pair of conductors 25 and 26 across which is applied a direct current potential V, a resistance 27 connected in series with a capacitance 28 between the air of conductors and a normally open switch 29 having one contact thereof connected to the junction of resistance 27 and capacitance 28. The other contact of the switch is connected to one side of a coil 30, the other side of which is connected to the capacitance 28 and the conductor 26. Output signals from the pulse generator may be taken from a coil 31 which is inductively coupled to the coil 30.

In the operation of the pulse generator, the capacitance 28 is normally charged to the direct current potential V, which potential may be derived from the subscriber loop over the conductors 25 and 26 by conduction through a relatively high resistance 27. When the contacts of the switch 29 are closed, the capacitance 28 discharges into the coil 30, starting a damped oscillatory wave train of a frequency determined by the parameters of the capacitance 28 and the coil 30. The output from the pulse generator may be taken directly if the circuit is bridged across the subscriber loop or may be taken from an auxiliary coil, such as the coil 31 shown in Fig. 2.

This circuit is advantageous in that it involves no sudden injection of energy into the tuning elements, and hence does not require a "spark killer" or other special protection of the contacts of the switch 29. The energy for the transient oscillatory wave is stored in the capacitance 28 at a moderate rate while the switch contacts are open between operations.

Figure 3:
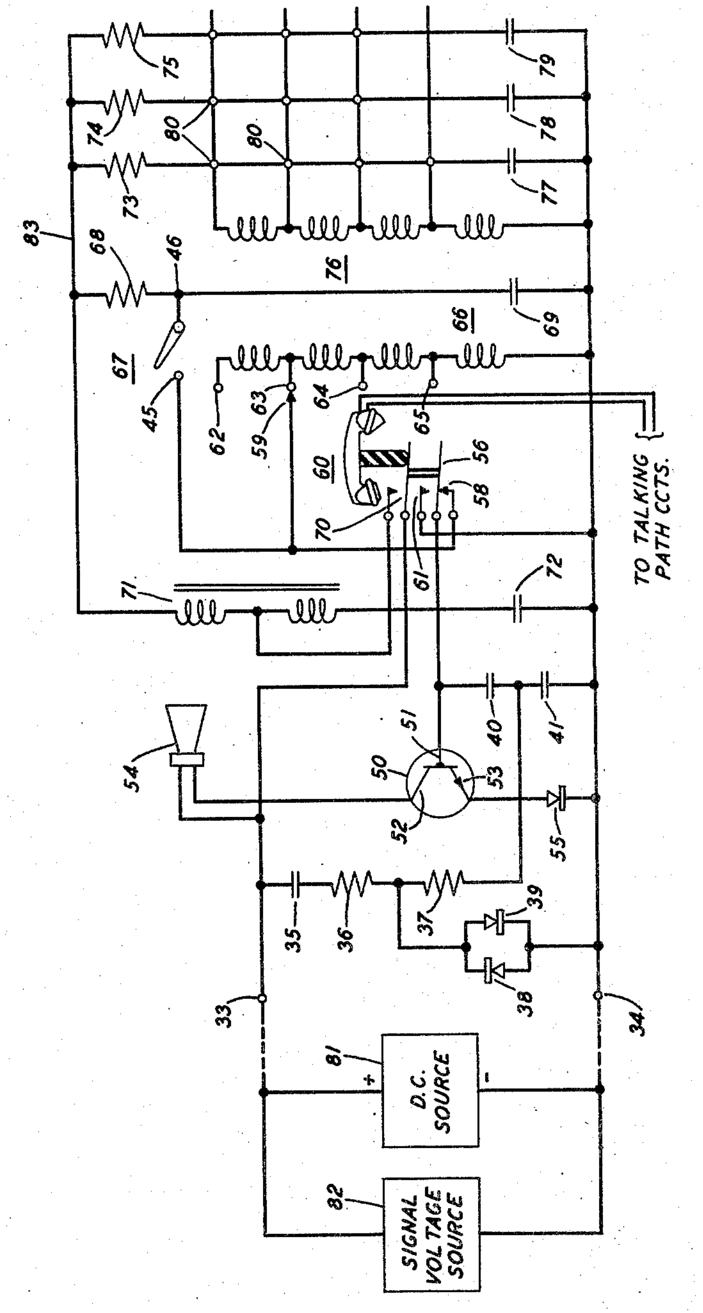
Fig. 3 is a schematic representation of a specific illustrative embodiment of a station set circuit embodying circuits of the type shown in Figs. 1 and 2 for carrying out the signaling functions of ringing, dialing and party identification.

The pulse generator circuit is advantageous further in that the frequency of the transient wave may be easily controlled by providing the coil 30 with a plurality of taps which may be selectively connected to the switch 29 and the capacitance 28, as will become apparent from the following description of a station set in accordance with the invention as illustrated by the circuit of Fig. 3. Further, it should be borne in mind that Fig. 2 is a diagrammatic representation for purposes of illustrating the operation of certain component elements of this invention. Advantageously, in accordance with one aspect of this invention, the coil 30 provided for generation of the line identification frequency signal is identical with the coil 8, provided for selective reception of the ringing frequency signals. As described below, the single common inductor may be switched from one circuit to the other, thereby reducing the overall size of the circuit and further preventing the line identification signal from one subset operating the ringing circuit of another subset, as the line identification signal and ringing signal frequencies for a single subset are thus readily made the same.

In the station set circuits disclosed in Fig. 3 a pair of line terminals 33 and 34 are connected to the subscriber loop. A series circuit arrangement of a capacitance 35, a resistance 36, a resistance 37, and a capacitance 41 is connected between the line terminals 33 and 34. A limiter, which consists of a pair of shunt connected oppositely poled diodes 38 and 39, is connected between the junction of resistances 36 and 37 and the line terminal 34. A transducer 54, which advantageously may be of the horn type, is connected at one terminal thereof to the line terminal 33 and at the other terminal to the collector electrode 52 of a transistor 50. The emitter electrode 53 of the transistor is connected through a diode 55 to the line terminal 34. The elements of the ringing circuit are readily recognizable as those described above with reference to Fig. 1.

The transistor base electrode 51 is connected through a capacitance 40 to the capacitance 41 and the resistance 37, and to the movable contact 56 of a switch 60 which is operated under the control of the switchhook on the telephone subset. Switch 60 has two stationary contacts, one of which, 61, is connected to the line terminal 34 and the other of which, 58, is connected to wire 59 which may selectively be connected, during installation of the subset, to any of a plurality of taps 62, 63, 64 and 65 on the coil 66.

Contact 58 of switch 60 is also connected to a terminal 45 of a normally open switch 67, the other terminal of which 46 is connected to the junction of a resistance 68 and a capacitance 69. The other side of capacitance 69 is connected to the line terminal 34.

The line terminal 33 is also connected to one contact of the normally open switch 70, which is controlled by the switchhook and is closed in the off hook condition; the other contact of switch 70 is connected to the windings of an autotransformer 71. One side of the autotransformer 71 is connected to a capacitance 72 which is in turn connected to the line terminal 34.

The other side of the autotransformer 71 is connected through a conductor 83 to the resistance 68 and also to the resistances 73, 74 and 75 of the digit pulse generator circuit. This circuit comprises a coil 76 from which, in accordance with one aspect of this invention, four different values of inductance may be obtained by means of taps. Each of the resistances 73, 74 and 75 is connected to one side of the capacitances 77, 78 and 79 respectively, the other sides of which are connected to the line terminal 34.

The operation of the line identification and digit pulse generator circuits can readily be understood from the above discussion relative to Fig. 2 of the drawing. In this specific embodiment conductor 83 corresponds to conductor 25 of Fig. 2, each of resistances 68, 73, 74 and 75 corresponds to resistance 27, and each of capacitors 69, 77, 78 and 79 corresponds to capacitor 28 of Fig. 2. In the line identification circuit the inductor 66 which is common to the ringing circuit, corresponds to the coil 30 of Fig. 2, and in the digit pulse generator circuits the tapped inductor 76 similarly corresponds to the coil 30. The simultaneous operation of the switch 67 and key 80, described below, function as the key or switch 29 in Fig. 2. In the embodiment of Fig. 3 the resultant frequency signal advantageously is transmitted directly over the conductor 83 rather than through an output coil 31 as in Fig. 2.

The capacitances 77, 78, 79 and the taps on the coil 76 advantageously are placed in a matrix arrangement having a plurality of crosspoints wherein any of the capacitances 77, 78 and 79 may be connected to any of the taps on the coil 76. This may be done by any suitable switching arrangement, but advantageously may be accomplished by means of a push button located above or adjacent to each crosspoint and arranged to close the corresponding crosspoint when depressed. The switch 67 is closed with each crosspoint to put the party pulse generator in operation.

With an arrangement such as that described above twelve possible frequencies may be obtained from the digit pulse generator, of which ten are actually needed for normal telephone requirements.

In the operation of the circuits disclosed in Fig. 3, the switches 70 and 60 are in the position shown when the switchhook of the station set is in the on hook condition. In this condition the station set is prepared for selective ringing operation and the digit pulse generator circuit, the autotransformer 71, and the capacitance 69 of the party identification circuit are disconnected from the subscriber loop. Conductor 59 is connected to the proper tap on the coil 66, normally done during installation, so that the selective filters is tuned to the signaling frequency assigned to the station set. It will be recognized by those skilled in the art that application of a signal via resistor 37 to the junction of two series connected tuning condensers 40 and 41 is substantially equivalent to application of the signal in Fig. 1 via a corresponding resistor 5 to a tap on a tuning coil 8. Thus, when ringing signals of the tuned frequency are transmitted over the party line from the central office suitable portions of these signals appear across the tuned circuit and are applied to the transistor 50 through the base electrode 51 where they are amplified to operate the transducer 54 in the collector electrode circuit. As explained above, in connection with the ringer circuit of Fig. 1, the bias producing silicon diode 55 in the emitter circuit of the transistor aids in suppressing unwanted signal frequencies, i. e., ringing signals for other station sets on the multiparty line, by an amplitude gating action. The limiter diodes 38 and 39 operate to control the amplitude of the signals applied to the tuned circuit in a manner explained above.

When the subscriber wishes to make a call, the switchhook is placed in the off hook condition. This closes the contact of the switch 70, connecting the party and digit pulse generators to the loop through the autotransformer 71, and connects contact 56 of the switch 60 with the contact 61 to inactivate the transducer 54 by placing a short across the input of the transistor 50. The purpose of the autotransformer 71 is to provide a better impedance match and thus make use of a larger fraction of the available transient energy coupled through the resistances 68, 73, 74 and 75 from the pulse generators.

The capacitances 69, 77, 78 and 79 are charged by the direct current potential provided over the loop as described above in connection with Fig. 2. The subscriber depresses the dial push buttons 80 corresponding to the digits of the number called. For each push button operation one of the condensers of the digit pulse generator discharges into the coil 76 and starts a damped oscillatory wave train of a frequency determined by the inductance and capacitance in the push button circuit, the wave train being indicative of the chosen digit. This signal is coupled through one of the resistances 73, 74 or 75 and the autotransformer 71 to the subscriber loop and the switching equipment in the central office.

Each time a push button 80 is depressed the contacts of the switch 67 of the party pulse generator are closed to discharge the capacitance 69 through the coil 66 to start a damped oscillatory wave train which is coupled through the resistance 68 to the central office to identify the calling party. Conductor 59 is connected to the proper tap on the coil 66 at the time of installation so that the oscillatory wave will be of the frequency designated to identify the calling party. Advantageously, the same frequency assignments should be made for both the ringing signals and the party identification signals. This is not only permits a saving in apparatus, such as enabling the same tapped coil to be used for both purposes, but results in conserving frequency space. In addition, this scheme avoids a form of cross signaling in which the ringer of one party might be activated by the party identification pulse signals of another.

Although the same coil is used for both ringing and party identification, separate tuning condensers are provided in the embodiment shown in the drawing. If it is desired to have an eight-party line rather than the four-party line discussed above, two additional capacitances may be connected into the circuit in parallel with the series combination of capacitances 40 and 41, and capacitance 69, respectively in the subsets of four of the eight parties. These added capacitances reduce the frequencies to which the other four parties are tuned by the same percentage to provide an additional set of four frequencies either below or interspersed between those of the first set.

Figure 4:
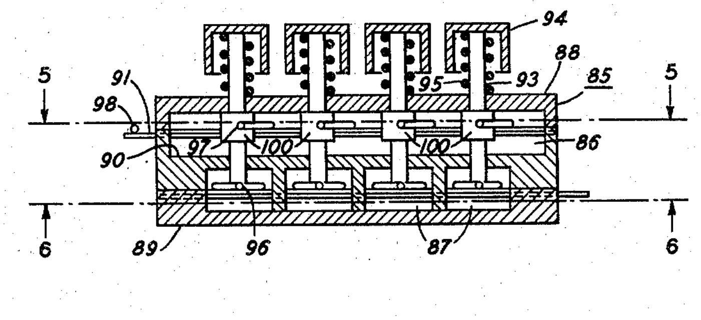
Figs. 4, 5 and 6 are sectional views of an illustrative embodiment of a push button crosspoint dialing arrangement applicable to the invention.
Figure 5:
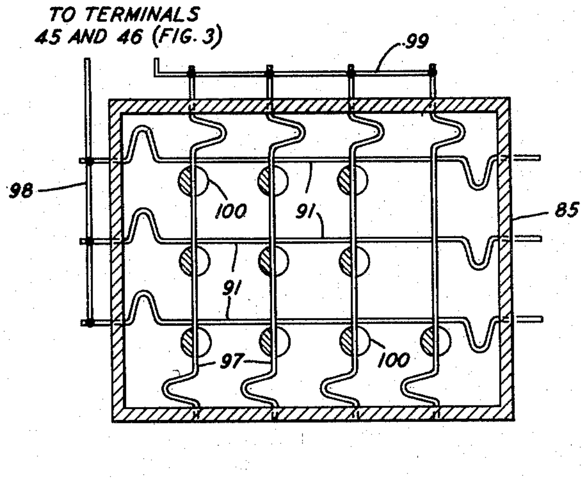
Figure 6:
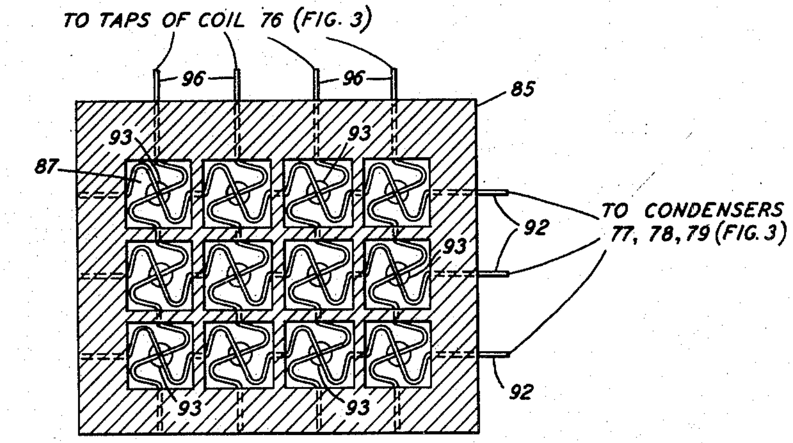

The combination of three capacitances and four coil taps in the digit pulse generator has been shown as a preferred illustrative embodiment of the invention as it permits a crosspoint configuration matching a physical layout of push buttons which has been found advantageous from an operation standpoint, namely, a three-by-three plus one arrangement. Figs. 4, 5 and 6 show several views of one possible mechanical embodiment of such an arrangement which embodies the desirable features of simple repetitive parts, molded plastic frames and absence of individual soldered connections at the crosspoints.

Fig. 4 is an elevational view of such a push button arrangement which comprises a frame 85, which advantageously may be made of plastic, having an upper member 88, a large hollow section 86 below the upper member 88, an intermediate member 90 located below the large hollow section 86 and connected to the upper member 88 of the frame 85, and a plurality of small hollow sections 87 having its upper and lower surfaces defined by the intermediate member 90 and a lower member 89 connected to the intermediate member 90. A plurality of wire spring contact members 91 and 97 are positioned at right angles to each other within the large hollow section, the ends of the contact members being embedded in the walls of the frame 85. A plurality of further wire spring contact members 92 and 96 at right angles to each other are positioned within the lower hollow sections 87, the members 92 being embedded in the walls between the hollow sections and the walls of the frame 85.

A number of push buttons 93, which advantageously may represent the digits 0 through 9, extend through apertures in the upper member 88 of the frame and in the intermediate member 90. Each push button comprises a cap 94 and is supported by a spiral spring 95 in compression between the cap 94 and the frame upper member 88. A stop member 100, having a slot therein for holding the wire spring contact members 97, is attached to each push button in the large hollow section 86. Each push button 93 has its lower surface located directly above one of the wire spring contact members 96 in the lower hollow sections 87.

Fig. 5 is a plan view taken along the line 5—5 in Fig. 4 and shows an arrangement which advantageously may comprise the switch 67 for operating the party pulse generator. Adjacent each row of push buttons 93 is a wire spring contact member 91, the ends of which are embedded in the walls of the frame 85. One end of each of the contact members 91 is extended beyond the wall of the frame where it is connected to a common lead which connects to the terminal 45, shown in Fig. 3. Similarly, the wire spring contact members 97 have their ends embedded in the walls of the frame 85, one end of each of the contact members being extended to connect to a common lead 99 which connects to the terminal 46, also shown in Fig. 3. The leads 97 are positioned at right angles to the leads 91 and pass through the slots in the stop members 100 attached to the push buttons 93 with the result that for each push button depressed by the calling party during the dialing operation a contact member 91 is placed in contacting relation with a contact member 97 to complete the discharge path of the capacitance 69 of the party pulse generator and transmit an identification signal to the central office over the subscriber loop.

Fig. 6 is a plan view taken along the line 6—6 in Fig. 4 and depicts one type of switching arrangement which may be used to complete the discharge circuit in the digit pulse generator. Each of the three wire spring contact members 92 is positioned within a number of the small hollow sections 87, the contact members being embedded in the walls of the frame 85 and in the dividing walls of the intermediate hollow sections 87. Similarly, each of the four wire spring contact members 96 extend through a number of the hollow sections 87, the ends of the contact members 96 being embedded in the walls of the frame 85 and intermediate portions of the members 96 being embedded in the dividing walls of the intermediate hollow section 87. Within each of the hollow sections 87, the members 96 are located above and in noncontacting relationship with the members 92, each of the members being shaped such that they pass at right angles to each other at the center of each section 87. Each of the contact members 92 is extended at one end thereof beyond the wall of the frame member and is connected to one of the capacitances 77, 78 and 79 in the digit pulse generator. Each of the contact members 96 has one end extended beyond the frame wall and is connected to one of the taps on the coil 76 of the digit pulse generator. The push buttons 93 are so disposed with respect to the contact members 96 that the depression of a push button places its corresponding member 96 in contact with a member 92 to complete a discharge path in the digit pulse generator and cause an oscillatory wave signal to be sent to the central office to indicate the dialed digit.

It is to be understood that the above-disclosed arrangements are merely illustrative of the application of the principles of the invention. Numerous other arrangements may be devised by those skilled in the art without departing from the spirit aand scope of the invention.

What is claimed is:

1. A subscriber set for carrying out the signaling functions of ringing, dialing, and party identification in a multiparty telephone system comprising a pair of conductors, a filter network tuned to a given frequency connected to said pair of conductors, a transistor amplifier connected to said filter network, bias means in circuit with said transistor amplifier whereby said transistor amplifier is responsive only to signals of said given frequency, transducer means connected to said transistor amplifier and responsive to the operation thereof to produce an audible ringing signal, means connected to said pair of conductors for generating digit signals of a plurality of frequencies, each frequency being indicative of a particular digit, a party pulse generator connected to said pair of conductors and utilizing an element of said filter network for generating an identification signal of said given frequency, and switching means controlled by said digit signal generating means for rendering said party pulse generator operative whereby operation of said digit generating means causes two signals to be produced simultaneously, one a signal to identify the calling party and the other a signal to identify the digit.

2. A subscriber set in accordance with claim 1 including a limiter circuit connected to said filter network, said limiter circuit comprising a pair of oppositely poled rectifying means to limit the amplitude of the signals applied to the filter network over the party line.

3. A subscriber set in accordance with claim 1 wherein said bias means comprises a semiconductor diode.

4. A subscriber set in accordance with claim 1 wherein said means for generating digit signals comprises a crosspoint arrangement of inductive and capacitive tuning elements and key means at each crosspoint for connecting a different combination of said tuning elements for each digit.

5. A subscriber set in accordance with claim 4 wherein said digit signals comprise damped oscillatory wave trains generated by the discharge of the capacitive tuning element into the inductive tuning elements upon operation of said key means.

6. A subscriber set in accordance with claim 1 wherein said party pulse generator comprises a coil of said filter network, said party pulse generator and said filter network being tuned to the same frequency.

7. A subscriber set in accordance with claim 6 having contacts controlled by the subscriber's set switchhook for placing said coil in said filter circuit in the on hook condition and in said party pulse generator in the off hook condition.

8. A subscriber subset for multiparty telephone systems comprising a transducer, filter circuit means responsive to a particular frequency ringing signal for operating said transducer, said filter circuit means including an inductor, frequency signal generating means for generating a line identification signal, said generating means including said inductor, a plurality of digit frequency generating means, means for simultaneously operating said first mentioned generating means whenever any of said second mentioned generating means is operated, and switch means for connecting said inductor to said filter circuit means when said subset is not in use and to said first mentioned generating means when said subset is in use.

9. In a station set for use in a multiparty telephone system, a ringing circuit comprising a pair of conductors, a filter network connected to said pair of conductors, said filter network comprising inductance and capacitance means connected in parallel, the values of said means being selected to render the filter network responsive to ringing signals of a predetermined frequency, a transistor comprising base, emitter and collector electrodes, the base electrode being connected to said filter network, a transducer connected between the collector electrode and one of said conductors, a biasing diode connected between the emitter electrode and the other of said conductors, and a limiter network connected to said pair of conductors and in circuit with said filter network for limiting the amplitude of the ringing signals applied to the filter network.

10. In a multiparty telephone system, a circuit responsive to signals of a predetermined frequency for producing audible ringing signals comprising selective filter means tuned to said predetermined frequency, a transistor amplifier in circuit with said filter means, normally non-conducting diode means connected to said transistor amplifier and providing a bias therefore whereby said transistor amplifier is responsive only to signals of amplitude sufficient to cause said diode means to conduct, and transducer means connected to said transistor amplifier and responsive to the output thereof to produce audible ringing signals.

11. In a multiparty telephone system, a pulse generating circuit comprising a pair of line conductors, a source of direct current potential connected to said pair of line conductors, a resistance in series with a capacitance connected between said line conductors whereby said capacitance is charged to said direct current potential through said resistance, inductance means connected at one end thereof to one of said line conductors, a normally open switch connected between the other end of said inductance means and said capacitance, and means to close said normally open switch to enable said capacitance to discharge through said inductance means and generate an oscillatory wave information signal.

12. In a multiparty telephone system, key pulse dialing means comprising a pair of line conductors, a source of direct current potential connected to said pair of line conductors, a plurality of capacitances connected at one end thereof to one of said line conductors, a plurality of resistances each connected between the other line conductor and the other end of each of said capacitances whereby each capacitance is charged to said direct current potential through its associated resistance, a coil having a plurality of taps thereon, said coil defining a number of inductance values, and key means adapted selectively to connect any of said capacitances to any of said taps whereby the selected capacitance discharges through the selected portion of the coil to generate an oscillatory wave digit signal, the frequency of said signal being determined by the values of the capacitance and inductance selected.

13. Key pulse dialing means for generating digit signals comprising a pair of conductors, a source of direct current potential connected to said pair of conductors, a plurality of capacitances, means to connect one of said pair of conductors to a terminal of each of said capacitances, a coil having a plurality of taps thereon, said coil defining a plurality of inductance values, means to connect said coil to one of said pair of conductors, and key means disposed in relation to said capacitances and said coil to enable any of said capacitances to be connected to any of said taps for generating oscillatory wave digit signals, the frequency of the signal being determined by the values of the capacitance and inductance connected by the key means.

14. Key pulse dialing means in accordance with claim 13 in which said capacitances and said taps define a crosspoint arrangement capable of providing digit signals of at least ten different frequencies to represent the digits 0 through 9.

15. Key pulse dialing means in accordance with claim 14 in which said key means comprises a frame having a plurality of hollow sections therein, a first set of conductors connected between two sides of said frame, a second set of conductors connected between the other two sides of said frame, said two sets of conductors being at right angles and in noncontacting relationship with each other, and a plurality of push buttons extending through the frame into the hollow sections for selectively placing any conductor of said first set in contact with any conductor of said second set.

16. Key pulse dialing means in accordance with claim 15 wherein each of said first set of conductors is connected to one of said capacitances, and each of said second set of conductors is connected to a tap on said coil.

17. A subscriber subset for multiparty telephone systems comprising ringing means responsive to a signal of a given frequency for producing an audible ringing signal, said ringing means including a filter network including an inductor, means for generating a line identification signal unique to the subset, said identification signal means including said inductor, and switch means for connecting said inductor to said filter circuit when said subset is in the on hook condition and to said signal generating means when said subset is in the off hook condition.

18. A subscriber set in accordance with claim 17 wherein said filter network also includes a capacitive element, said capacitive elements being of such values that said filter network and said signal generating means are tuned to the same frequency.

19. A subscriber set in accordance with claim 18 further including means for generating a plurality of digit frequency pulses, said last mentioned means including a plurality of capacitances and a tapped inductor, and means for operating said signal generating means simultaneously with each operation of said digit frequency generating means.

20. A subscriber set in accordance with claim 19 wherein said digit frequency generating means comprises a crosspoint arrangement of inductive and capacitive elements and key means at each crosspoint for connecting a different combination of said tuning elements for each digit, said digit signals and said line identification signals being simultaneously generated oscillatory waves.

21. A subscriber subset for multiparty telephone systems comprising means responsive to a particular frequency for producing an audible ringing signal, said means including a transducer, a transistor amplifier for operating said transducer, and a filter network including an inductor, means for generating a line identification signal unique to the subset, said signal generating means including said inductor of said filter network, means for generating a plurality of digit signal frequencies, said signal generating means being operated on each operation of said digit signal generating means, and switch means for connecting said inductor to said filter network when said subset is in the on hook condition, for connecting said inductor to said signal generating means when said subset is in the off hook condition, and for shorting said transistor amplifier to render it inoperative when said subset is in the off hook condition.

References Cited in the file of this patent

UNITED STATES PATENTS

| | | |
|---|---|---|
| 2,277,228 | Hecht | Mar. 24, 1942 |
| 2,403,475 | Bascom et al. | July 9, 1946 |
| 2,706,223 | Lovell et al. | Apr. 12, 1955 |